United States Patent
Latkar et al.

(10) Patent No.: US 11,625,312 B2
(45) Date of Patent: Apr. 11, 2023

(54) SYSTEM FOR CONTINUOUS MANAGEMENT AND MONITORING OF ROBOTIC PROCESS AUTOMATION BOTS

(71) Applicant: Bank of America Corporation, Charlotte, NC (US)

(72) Inventors: Sachin Mahalasakant Latkar, North Brunswick, NJ (US); Raghavendra Razanala, Hyderabad (IN); Shankar Ramasubramanian Iyer, East Windsor, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1049 days.

(21) Appl. No.: 16/368,194

(22) Filed: Mar. 28, 2019

(65) Prior Publication Data

US 2020/0306970 A1    Oct. 1, 2020

(51) Int. Cl.
*G06F 11/00* (2006.01)
*G06F 11/34* (2006.01)
*G06F 11/07* (2006.01)

(52) U.S. Cl.
CPC ...... *G06F 11/3476* (2013.01); *G06F 11/0706* (2013.01); *G06F 11/0766* (2013.01); *G06F 11/0793* (2013.01); *G06F 2201/865* (2013.01)

(58) Field of Classification Search
CPC ............ G06F 11/0703; G06F 11/0706; G06F 11/0709; G06F 11/0736; G06F 11/0751; G06F 11/0766; G06F 11/0793; G06F 11/3003; G06F 11/302; G06F 11/3065; G06F 11/3476; G06F 2201/865; G05B 2219/50391; B25J 9/0084; B25J 9/1674
See application file for complete search history.

(56) References Cited

U.S. PATENT DOCUMENTS

| | | | |
|---|---|---|---|
| 7,801,644 B2 | 9/2010 | Bruemmer et al. | |
| 8,930,022 B1 | 1/2015 | Kuffner, Jr. et al. | |
| 9,008,839 B1 | 4/2015 | Kuffner, Jr. et al. | |
| 9,817,967 B1 | 11/2017 | Shukla et al. | |
| 10,307,906 B2 | 6/2019 | Shah et al. | |
| 10,339,027 B2 | 7/2019 | Garcia et al. | |
| 10,365,799 B2 | 7/2019 | Hosbettu et al. | |
| 10,682,761 B2 | 6/2020 | Geffen et al. | |
| 10,768,977 B1* | 9/2020 | Paul | H04L 63/101 |
| 2013/0013953 A1* | 1/2013 | Eck | G06F 11/0712 718/1 |
| 2017/0173784 A1 | 6/2017 | Shah et al. | |
| 2017/0220324 A1 | 8/2017 | Balasubramanian et al. | |

(Continued)

*Primary Examiner* — Anthony J Amoroso
(74) *Attorney, Agent, or Firm* — Moore & Van Allen PLLC; Seongun M. Hong

(57) ABSTRACT

Embodiments of the present disclosure provide a system for continuous and real-time management and monitoring of robotic process automation bots. In particular, the architecture of the system may comprise a centralized hub which provides various features and functions for bot management and monitoring, such as real-time health status updates, granular logging and notification functions, failure detection and reporting for debugging, bot inventory systems, or the like. Through the use of the components and/or features as described herein, the system may provide an efficient way to manage and monitor robotic process automation bots within a computing environment.

14 Claims, 2 Drawing Sheets

(56) References Cited

U.S. PATENT DOCUMENTS

| | | |
|---|---|---|
| 2017/0352041 A1 | 12/2017 | Ramamurthy et al. |
| 2018/0019712 A1 | 1/2018 | Kobayashi |
| 2019/0037012 A1 | 1/2019 | Stöcker |
| 2019/0087395 A1 | 3/2019 | Priestas et al. |
| 2019/0102676 A1 | 4/2019 | Nazari et al. |
| 2019/0155225 A1* | 5/2019 | Kothandaraman .. G05B 13/041 |
| 2019/0188269 A1* | 6/2019 | Chandrasekaran ..... H04L 51/02 |
| 2019/0244149 A1 | 8/2019 | Krishnaswamy |
| 2019/0286736 A1 | 9/2019 | Sturtivant |
| 2019/0332508 A1 | 10/2019 | Goyal et al. |

\* cited by examiner

SYSTEM FOR CONTINUOUS MANAGEMENT AND MONITORING OF ROBOTIC PROCESS AUTOMATION BOTS

FIELD OF THE INVENTION

The present disclosure embraces a system for continuous management and monitoring of robotic process automation bots. In particular, the system may comprise a digital control room or hub which provides real-time status updates and integrated logging and reporting functions.

BACKGROUND

Computer-based information systems may use process automation to accomplish various objectives within the computing environment. That said, conventional automation systems lack status and reporting capabilities such that the state of certain components within the automation systems may not be readily determined. Furthermore, conventional systems may also lack detailed logging capabilities such that error and/or failure logs may not provide adequate information regarding the error and/or failure of automation components. Accordingly, there is a need for an efficient and centralized way to monitor and manage automation systems on a real-time basis.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present disclosure address the above needs and/or other needs by providing a system for continuous and real-time management and monitoring of robotic process automation bots. In particular, the architecture of the system may comprise a centralized hub which provides various features and functions for bot management and monitoring, such as real-time health status updates, granular logging and notification functions, failure detection and reporting for debugging, bot inventory systems, license management features, or the like. Through the use of the components and/or features as described herein, the system may provide an efficient way to manage and monitor robotic process automation bots within a computing environment.

Accordingly, embodiments of the present disclosure provide a system for management and monitoring of robotic process automation bots. The system may comprise a memory device with computer-readable program code stored thereon; a communication device; and a processing device operatively coupled to the memory device and the communication device. The processing device may configured to execute the computer-readable program code to continuously monitor a real-time status of a bot via a centralized bot management hub, wherein the bot is hosted on a bot computing system; receive, from the bot, a bot log, wherein the bot log comprises the real-time status of the bot and a status of steps taken by the bot; detect that the bot is in a failed state; transmit a notification to a user computing system operated by a user, wherein the notification comprises information associated with the failed state of the bot; and based on the information associated with the failed state of the bot, remediate the failed state of the bot.

In some embodiments, the processing device is further configured to determine, from the bot log, that a failure in a target application caused the failed state; and remediate the failed state of the bot by restarting the target application.

In some embodiments, the processing device is further configured to detect that the bot has stopped responding; based on detecting that the bot has stopped responding, determine that the failed state bot is caused by a hardware failure within the bot computing system; and remediate the failed state of the bot by remediating the hardware failure.

In some embodiments, the bot log further comprises a step at which the bot has failed in an automation process.

In some embodiments, the notification is a role-based notification based on an identity of the user.

In some embodiments, the user is a systems administrator, wherein the notification comprises technical data regarding the failed state of the bot.

In some embodiments, the user is an organizational leader, wherein the notification comprises real-time efficiency data.

In some embodiments, the centralized bot management hub uses API integration to communicate with the bot computing system and user computing system.

In some embodiments, the centralized bot management hub comprises a license management component, wherein the license management component provides license information associated with the bot.

In some embodiments, the bot log further comprises audit information, wherein the audit information indicates a compliance of the bot with regulations or policies.

Embodiments of the present disclosure also provide a computer program product for management and monitoring of robotic process automation bots. The computer program product may comprise at least one non-transitory computer readable medium having computer-readable program code portions embodied therein. The computer-readable program code portions may comprise executable code portions for continuously monitoring a real-time status of a bot via a centralized bot management hub, wherein the bot is hosted on a bot computing system; receiving, from the bot, a bot log, wherein the bot log comprises the real-time status of the bot and a status of steps taken by the bot; detecting that the bot is in a failed state; transmitting a notification to a user computing system operated by a user, wherein the notification comprises information associated with the failed state of the bot; and based on the information associated with the failed state of the bot, remediating the failed state of the bot.

In some embodiments, the computer-readable program code portions further comprise executable code portions for determining, from the bot log, that a failure in a target application caused the failed state; and remediating the failed state of the bot by restarting the target application.

In some embodiments, the computer-readable program code portions further comprise executable code portions for detecting that the bot has stopped responding; based on detecting that the bot has stopped responding, determining that the failed state bot is caused by a hardware failure within the bot computing system; and remediating the failed state of the bot by remediating the hardware failure.

In some embodiments, the notification is a role-based notification based on an identity of the user.

In some embodiments, the user is a systems administrator, wherein the notification comprises technical data regarding the failed state of the bot.

Embodiments of the present disclosure also provide a computer-implemented method for management and monitoring of robotic process automation bots. The method may comprise continuously monitoring a real-time status of a bot via a centralized bot management hub, wherein the bot is hosted on a bot computing system; receiving, from the bot, a bot log, wherein the bot log comprises the real-time status of the bot and a status of steps taken by the bot; detecting that the bot is in a failed state; transmitting a notification to a user computing system operated by a user, wherein the notification comprises information associated with the failed state of the bot; and based on the information associated with the failed state of the bot, remediating the failed state of the bot.

In some embodiments, the method further comprises determining, from the bot log, that a failure in a target application caused the failed state; and remediating the failed state of the bot by restarting the target application.

In some embodiments, the method further comprises detecting that the bot has stopped responding; based on detecting that the bot has stopped responding, determining that the failed state bot is caused by a hardware failure within the bot computing system; and remediating the failed state of the bot by remediating the hardware failure.

In some embodiments, the notification is a role-based notification based on an identity of the user.

In some embodiments, the user is a systems administrator, wherein the notification comprises technical data regarding the failed state of the bot.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
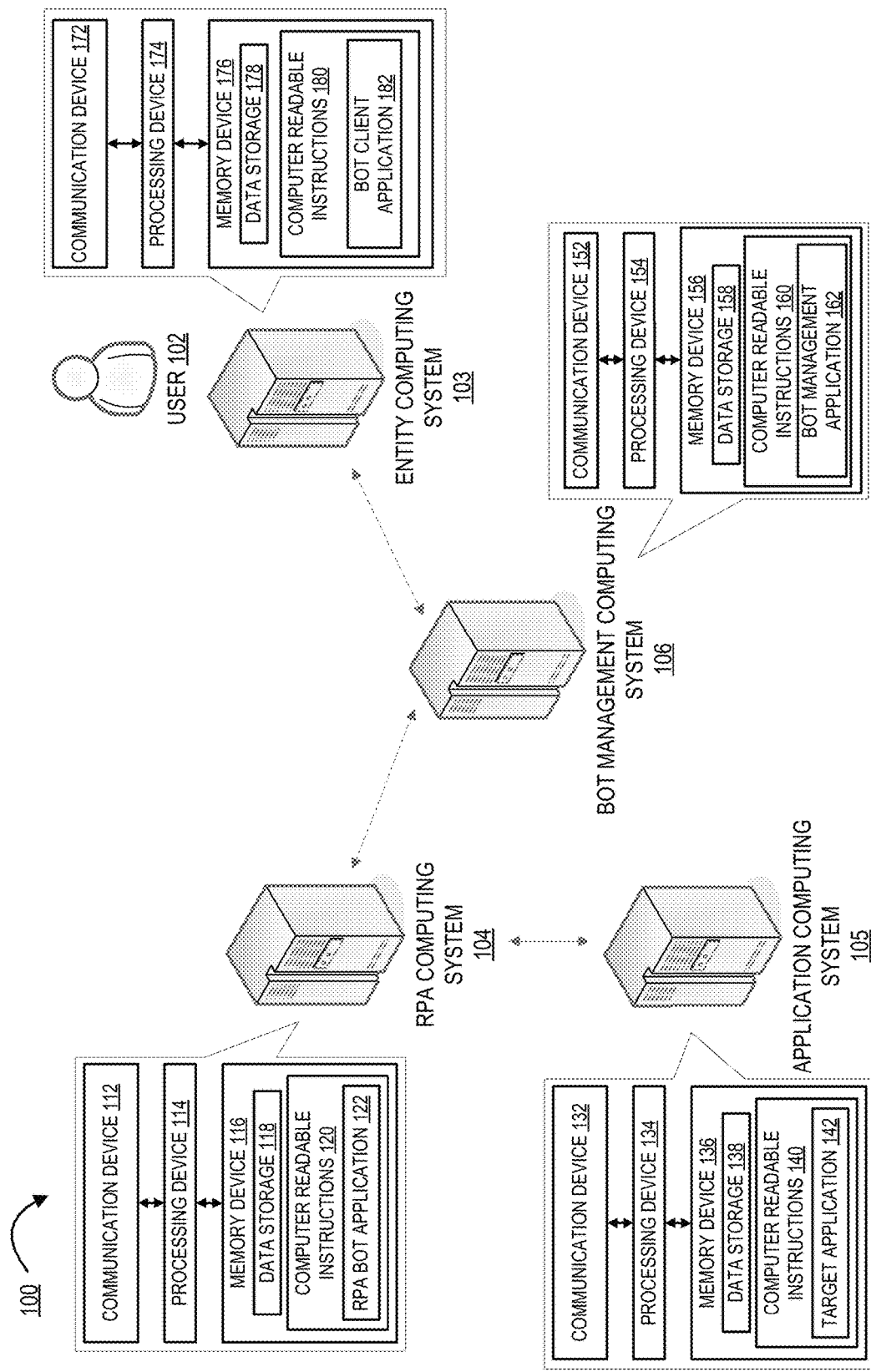
Figure 2:
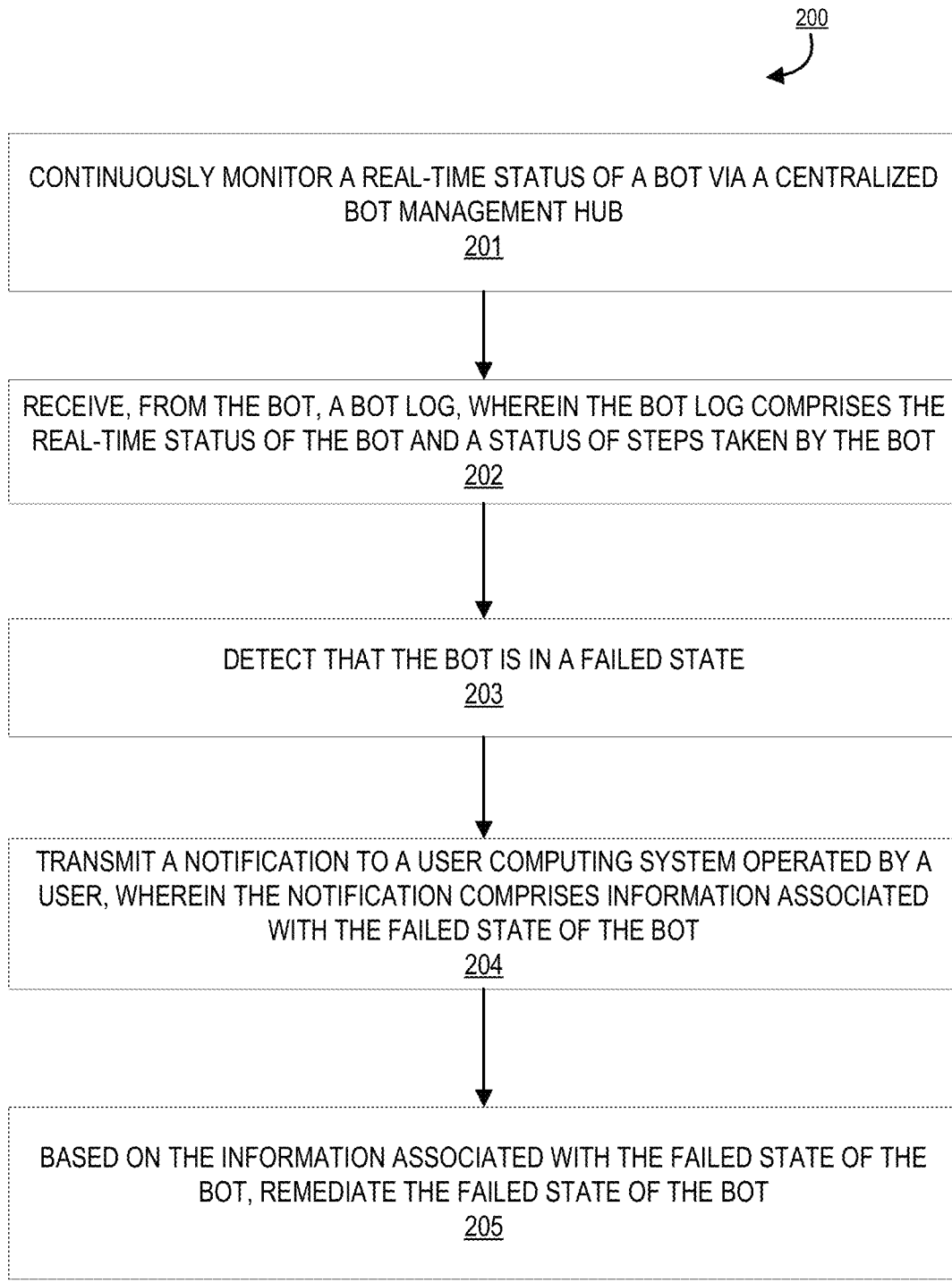

Having thus described embodiments of the invention in general terms, reference will now be made to the accompanying drawings, wherein:

FIG. 1 illustrates an operating environment for the bot management system, in accordance with one embodiment of the present disclosure; and FIG. 2 illustrates a process flow for the bot management system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

"Robotic process automation" or "RPA" as used herein may refer to the automation of high-volume processes using bots.

"Bot" as used herein may refer to a software application that performs automated tasks. In particular, a plurality of bots may be used by an entity to perform various functions for high-volume applications that relate to the entity's objectives. Typically, a bot will be configured to repeatedly perform a specific task. Each bot may be configured to utilize particular protocols and be compatible with particular platforms and applications. In some embodiments, a bot may be configured to execute its tasks by interacting with other applications within the entity's systems at the interface level (i.e. by providing inputs to the interfaces of the other applications).

As described above, the entity system may use one or more RPA bots to perform automated functions to accomplish its objectives. In this regard, the entity system may comprise a centralized bot hub (or "bot management system") which may be in operative communication with the various bots to allow for integrated real-time management and monitoring. In particular, the bot management system comprise a bot inventory, where the bot inventory comprises a list of currently active bots and/or bots that have been previously used. The system may constantly monitor the status and/or "health" of each currently active bot in the inventory in real time (e.g., uptime, processing load, idle status, error/failure status, or the like). In this way, the system may be able to keep up to date on the current status of each bot in the entity system, thereby allowing the entity to efficiently redistribute processing load to idle bots. Furthermore, the status monitoring capabilities of the system also prevent bots from failing "silently" (e.g., stop running upon encountering a failure without notification).

In some embodiments, each RPA bot may be configured to generate detailed processing logs which capture each step that the RPA bot takes within the entity system. For example, one type of RPA bot may be configured to access a certain application (e.g., a user data management application which organizes user data, such as user names, contact information, account information, or the like) to perform a certain task (e.g., populating forms with the user data). The bots may capture and log data regarding actions taken by the bot within the entity system, such as actions taken within various applications, log files written, current operating parameters, bot status, or the like. In this way, the processing logs may allow the entity (e.g., via an administrator) to determine the exact point of failure for each bot. For instance, a processing log may indicate that a bot has stopped working because an application associated with the bot has crashed. Accordingly, the administrator may determine that the crashed application must be restarted and/or debugged to restore operation. In other embodiments, the processing log may indicate that the failure is with the bot itself. In such embodiments, the administrator may determine that the failed bot should be restarted and/or debugged. In some embodiments, the logs may further contain operational data with respect to actions taken by the bot. For example, an entity may be subject to certain organizational, regulatory, or legal rules and/or policies with respect to the RPA implementations (e.g., data privacy rules regarding the processing of user data, data security and threat protection policies, or the like). In this regard, the operational data may comprise information that may be used by the entity and/or third parties to audit the actions of each RPA bot taken within the entity system. In cases in which the log is being audited for data privacy compliance, the private data may be masked or sanitized before being sent to an auditor.

In some embodiments, the bot management system may comprise communication integration to allow the bot management system to communicate with one or more computing systems within the entity system. For instance, the bot management system may feature application programming interface ("API") integration to allow the bot management system to send notifications and/or alerts to one or more computing systems regarding bot status, bot inventories, log data, or the like. In this way, the bot management system may run in a headless configuration to constantly monitor the bots and trigger real-time notifications to efficiently and expediently remediate errors occurring in the entity system. Notifications may be sent to one or more users within the entity system through various communication channels, including instant message, in-app notifications, e-mail, SMS, push and/or pop-up notifications, or the like.

In some embodiments, the bot management system may further comprise a license management component which comprises license information regarding the various bots used within the entity system. In particular, the license information may include license terms, bot utilization information (e.g., frequency, total uptime, actions performed, or the like), bot owner/administrator information, or the like. In this way, the system is able to provide entity administrators with a consolidated platform through which the administrators may view and/or manage bot licenses.

The system as described herein confers a number of technological advantages over methods involving conventional methods of process automation systems. In particular, by tracking bot "health" status and transmitting notifications to users/administrators in real time, the system enables the user and/or entity to prevent inefficient distribution of processing workloads (e.g., some bots are overloaded while others are idle) by providing administrators with time-sensitive bot status information. Furthermore, the detailed logging of the bot management system provide system administrators with granular error data to facilitate expedient and accurate remediation of errors occurring within one or more bots in the entity system.

Turning now to the figures, FIG. 1 illustrates an operating environment 100 for the bot management system, in accordance with one embodiment of the present disclosure. In particular, FIG. 1 illustrates a bot management computing system 106 that is operatively coupled, via a network, to an RPA computing system 104 and/or an entity computing system 103. In such a configuration, the bot management computing system 106 may transmit information to and receive information from the RPA computing system 104 and/or the entity computing system 103. In some embodiments, the bot management computing system 106 may also be in operative communication with an application computing system 105. It should be understood that FIG. 1 illustrates only an exemplary embodiment of the system environment 100, and it will be appreciated that in other embodiments one or more functions of the systems, devices, or servers as depicted in FIG. 1 may be combined into a single system, device, or server. In other embodiments, a single system, device, or server as depicted in FIG. 1 may represent multiple systems, devices, or servers.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The RPA computing system 104 may be a device owned and/or operated by an entity which hosts one or more RPA bots that are programmed to perform various automated functions within the entity system. The RPA computing system 104 may be, for example, a networked terminal, server, desktop computer, or the like, though it is within the scope of the disclosure for the RPA computing system 104 to be a portable device such as a cellular phone, smart phone, smart device, personal data assistant (PDA), laptop, or the like. The RPA computing system 104 generally comprises a communication device 112, a processing device 114, and a memory device 116. The processing device 114 is operatively coupled to the communication device 112 and the memory device 116. The processing device 114 uses the communication device 112 to communicate with the network and other devices on the network, such as, but not limited to the bot management computing system 106 and/or the application computing system 105. As such, the communication device 112 generally comprises a modem, antennae, WiFi or Ethernet adapter, radio transceiver, or other device for communicating with other devices on the network.

The RPA computing system 104 comprises computer-readable instructions 120 and data storage 118 stored in the memory device 116, which in one embodiment includes the computer-readable instructions 120 of an RPA bot application 122. The RPA bot application 122 may comprise one or more RPA bots used by the entity to perform automated processes. In this regard, the RPA computing system 104 may be configured to receive communications from and/or send communications to the bot management computing system 106 and/or the application computing system 105.

As further illustrated in FIG. 1, the bot management computing system 106 may comprise a communication device 152, a processing device 154, and a memory device 156. The bot management computing system 106 may be owned and/or operated by an entity such as an Internet service provider, financial institution, business organization, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the RPA computing system 104, the application computing system 105, and/or the entity computing system 103. The communication device 152 generally comprises a modem, antennae, WiFi or Ethernet adapter, radio transceiver, or other device for communicating with other devices on the network.

As further illustrated in FIG. 1, the bot management computing system 106 comprises computer-readable instructions 160 stored in the memory device 156, which in one embodiment includes the computer-readable instructions 160 of a bot management application 162 which allows the entity system to perform the various bot management, monitoring, notification, and other related functions as described herein. In some embodiments, the memory device 156 includes data storage 158 for storing data related to the system environment, but not limited to data created and/or used by the bot management application 162. The bot management application 162 may comprise computer-executable program code which may instruct the processing device 154 to perform certain logic, data processing, and data storing functions of the application to accomplish the entity's objectives.

In some embodiments, the operating environment 100 may further comprise one or more entity computing systems 103, which may also be referred to herein as "user computing systems." The entity computing system 103 may refer to a computing system which may be owned and/or operated by a user 102 within the entity. For instance, in some embodiments, the user 102 may be an administrator or technician who may be tasked with monitoring and/or maintaining the bots. In other embodiments, the user 102 may be a manager within the entity who may make organizational decisions regarding the bots and/or the functions performed by the bots (e.g., regulatory/policy compliance, bot licensing, or the like). Accordingly, the entity computing system 103 may also comprise a processing device 174 operatively coupled to the communication device 172 and a memory device 176 comprising data storage 178 and computer readable instructions 180. The computer readable instructions 180 may comprise a bot client application 182 which may be configured to instruct the processing device 174 to execute certain functions over the network, such as interacting with the bot management computing system 106, application computing system 105, and/or the RPA computing system 104. In particular, an administrator may receive notifications (e.g., from the bot management computing system 106) and/or perform bot management through the entity computing system 103. In some embodiments, the reports generated by the bot management system 106 may depend on the role of the user 102. For instance, different types of bot-related data may be submitted to administrators, support staff, programmers, or entity leadership (e.g., debugging information may be sent to programmers/administrators, while license information may be sent to entity leadership).

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

As described above, the operating environment 100 may further comprise an application computing system 105, which may in turn comprise a processing device 134 operatively coupled to a communication device 132 and a memory device 136. The memory device 136 may comprise data storage 138 and computer readable instructions 140 comprising one or more target applications 142. The target applications 142 may be applications accessed by the one or more bots within the RPA bot application 122 to accomplish various objectives and/or goals of the entity. For instance, if the entity is a business, certain target applications 142 may be accessed by the RPA bots to perform tasks such as user data management, automatic population of forms, processing of "know your customer" ("KYC") documents, client onboarding, transaction processing, or the like. In some embodiments, the RPA bots may be configured to interact with the application on the interface level (e.g., provide inputs to and receive outputs from the application through the graphical interface layer).

The bot management computing system 106 may serve as a centralized bot management hub to allow for management, logging, and/or monitoring of the various bots within the RPA bot application 122 and/or the one or more target applications 142. In particular, the bot management computing system 106 may constantly probe the one or more bots to obtain the status of all bots currently in use within the entity system. For instance, a bot may report various different types of statuses, such as "working," "idle," "error," or the like. In some cases, the bot management computing system 106 may further detect that the bot is non-responsive. The bot management computing system 106 may be configured to periodically provide notifications to the entity computing system 103 with the statuses of the bots in real-time. In this regard, the bot management computing system 106 may feature API integration to send bot-related data to the other computing systems within the operating environment 100 (e.g., the entity computing system 103) via one or more of various different communication channels (e.g., e-mail, instant message, pop-up notification, SMS, voice message, or the like). In some embodiments, the bot management hub may be a technology-agnostic platform based on open architecture which may be configured to be compatible with various types of RPA bot solutions and/or reporting servers and/or software.

In some embodiments, the bot management computing system 106 may further provide a bot inventory and license management system for the bots within the bot inventory. The license management system may comprise various reporting and/or analytics functions with respect to bot licensing, such as licensing terms and/or costs, efficiency, frequency of use, or the like. In some embodiments, the license management system may further track software/firmware versions of the bots in use and generate security update and/or patching schedules based on the version information. In some embodiments, the license management system may further provide regulatory/policy compliance information regarding each bot within the bot inventory.

The bots may be configured to track each step that the bot takes with respect to its assigned processes and maintain a detailed log of steps taken. If the bot returns an error status, the detailed log may provide administrators with the necessary information to determine the cause of the error (e.g., the step at which the automation process has failed as well as the source system of the failure) and thus determine the steps that must be taken to remediate the error. For example, a bot may return an "error" status upon detecting that a certain UI element within the target application 142 is missing and/or unresponsive (e.g., a "screen lock" issue within the target application 142). In such a scenario, the bot management computing system 106 may determine that the target application 142 is the cause of the error rather than the bot itself. The bot management computing system 106 may then send a notification to an administrator through the entity computing system 103 with the detailed error logging information such that the administrator may make a decision on how to remediate the error (e.g., restart and/or reinstall the application). In other embodiments, the bot management computing system 106 may detect that the bot itself is experiencing issues (e.g., the bot does not respond to queries from the bot management computing system 106). In such embodiments, the bot management computing system 106 may send a notification to the administrator that the bot is unresponsive, which may necessitate the execution of remedial processes on the RPA computing system 104. In some embodiments, the bot management computing system 106 may automatically perform one or more remedial processes as described above to rectify the error within the bot and/or the target application 142. In this way, the system may provide an expedient and efficient way to debug errors within the automation process.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

In some embodiments, the computing systems may identify the activity associated with a service. The RPA computing system 104 and/or the entity computing system 103 may do this via the gyroscopic device, positioning system device, camera, and the like. As such, the computing systems may identify when a product is being used, how often it is being used, the phase of the service, and the like.

As described above, the computing systems may be one or more of various types of "smart devices." For example, the computing systems may be a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of IoT devices or smart devices provided herein is not exhaustive such that the computing systems may be any device that includes a communication interface or module, software and/or hardware that allow the device to communicate data and/or information related to the device with other devices and/or systems over network.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for the bot monitoring and management system, in accordance with some embodiments of the present disclosure. The process 200 begins at block 201, where the system continuously monitors a real-time status of a bot via a centralized bot management hub. In particular, the entity system may use numerous RPA bots to perform various automated processes to accomplish the entity's objectives. Each bot may continuously report its current status to the bot management hub such that the bot management hub may be aware of the real-time status of each bot within the entity system. Examples of such real-time statuses may include, for example, may indicate that a particular bot is currently processing, idle, failed, or the like. Using said real-time status information, but bot management system may create an up-to-date view of the status of all bots in the entity system, which may then allow the entity to remediate failed bots and/or redistribute computing loads to efficiently manage the automated processes.

The process continues to block 202, where the system receives, from the bot, a bot log, wherein the bot log comprises the real-time status of the bot and a status of steps taken by the bot. Each bot may generate its own bot log which reflects the current status of the bot as well as the particular steps it has taken and/or the steps that it will take in the future within the automated process. The bot log may further comprise audit information which may be used to determine whether the actions of the bot are in compliance with certain regulatory policies, laws, organizational rules, or the like. For instance, to the extent that a bot may be processing data which may be subject to data privacy laws which govern the treatment of personal user data, the audit information may include information such as where such user data has been stored, encryption methods used, adherence to security policies, data disposal, copies of data created, or other types of information which may be relevant to the compliance of the bot with such data privacy laws.

The process continues to block 203, where the system detects that the bot is in a failed state. In some embodiments, the entity system may detect that the bot is in a failed state by reading the real-time status of the bot from the bot log. For instance, the real-time status of the bot may indicate that the bot has stopped working and is unable to resume the automated process (e.g., due to a hardware and/or software issue). In other embodiments, the entity system may detect that the bot is in a failed state upon detecting that the bot has stopped responding to the bot management hub.

The process continues to block 204, where the system transmits a notification to a user computing system operated by a user, wherein the notification comprises information associated with the failed state of the bot. In some embodiments, the user computing system (or entity computing system) may be operated by various different users within the entity. For instance, the user may be a systems administrator, production support staff, operational leaders, internal or third party auditors, or the like. In this regard, the notification may contain different types of information based on the role of the user who receives the notification (e.g., a role-based notification). For instance, if the user is a systems administrator or production support staff, the notification may include technical information to be used in the debugging process (e.g., error codes, current statuses, recommended remedial steps, or the like).

In other embodiments, such as when the user is an operational leader, the notification may include information such as the frequency of use of the bot, licensing terms and/or costs, or the like. In some embodiments, the bot management hub may further perform predictive analytics to provide projected data related to the use of certain bots. For instance, the projected data may include operating efficiencies or realized productivity gains/losses associated with running particular bots on a projected timeline. Based on such information, the operational leader may make certain decisions with respect to the entity, such as whether to continue using a particular bot or to calculate efficiencies or benefits conferred by the bot over time. In yet other embodiments, such as when the user is an auditor, the notification may comprise audit information regarding the bot's compliance (or noncompliance) with rules, regulations, polices, laws, or the like.

The process continues to block 205, where the system, based on the information associated with the failed state of the bot, remediates the failed state of the bot. Based on the bot log information and/or other information gathered via the bot management hub, the entity may take the necessary steps to restore the bot's functionality. For example, the bot log information may indicate that the bot has failed at the step of accessing a certain UI element within the target application (e.g., the interface of the target application has been locked or is otherwise inaccessible). In such scenarios, the entity (e.g., the production support teams) may identify the application as the cause of the error and execute remedial steps to restore the application to working condition. In other embodiments, the bot log information may indicate that the bot has failed (e.g., incorrect/corrupt automation scripts or macros, shortage of system resources, or the like). In yet other embodiments, the bot management hub may detect that a particular bot has stopped responding to status inquiries. In such embodiments, the entity may identify the bot itself as the cause of the error and execute remedial steps accordingly, thereby expediting the debugging process.

In some embodiments, the remediation of the bot error may be executed manually by a system administrator or production support staff. For instance, if the error was caused because the bot has stopped responding, the user may take such steps as restarting the server which hosts the bot, replacing faulty hardware components, replacing corrupted system files, removing malware, performing software updates, or the like. On the other hand, if the error was caused on the application side (e.g., the application has frozen or the computing system hosting the application has become unavailable), remediation of the error may comprise restarting the unresponsive application, reinstalling the application, performing software updates on the application, or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for management and monitoring of robotic process automation bots, the system comprising:
    a memory device with computer-readable program code stored thereon;
    a communication device; and
    a processing device operatively coupled to the memory device and the communication device, wherein the processing device is configured to execute the computer-readable program code to:
        continuously monitor a real-time status of a bot via a centralized bot management hub, wherein the bot is hosted on a bot computing system and is configured to interact with a target application through a graphical interface layer of the target application;
        receive, from the bot, a bot log, wherein the bot log comprises the real-time status of the bot and a status of steps taken by the bot;
        detect that the bot is in a failed state by determining, based on the bot log, that a user interface element within the target application has become unresponsive;
        transmit a notification to a user computing system operated by a user, wherein the notification comprises information associated with the failed state of the bot; and
        based on the information associated with the failed state of the bot, remediate the failed state of the bot, wherein remediating the failed state of the bot comprises applying a software update to the target application.

2. The system according to claim 1, wherein the bot log further comprises a step at which the bot has failed in an automation process.

3. The system according to claim 1, wherein the notification is a role-based notification based on an identity of the user.

4. The system according to claim 3, wherein the user is a systems administrator, wherein the notification comprises technical data regarding the failed state of the bot.

5. The system according to claim 3, wherein the user is an organizational leader, wherein the notification comprises real-time efficiency data.

6. The system according to claim 1, wherein the centralized bot management hub uses API integration to communicate with the bot computing system and user computing system.

7. The system according to claim 1, wherein the centralized bot management hub comprises a license management component, wherein the license management component provides license information associated with the bot.

8. The system according to claim 1, wherein the bot log further comprises audit information, wherein the audit information indicates a compliance of the bot with regulations or policies.

9. A computer program product for management and monitoring of robotic process automation bots, the computer program product comprising at least one non-transitory computer readable medium having computer-readable program code portions embodied therein, the computer-readable program code portions comprising executable code portions for:

continuously monitoring a real-time status of a bot via a centralized bot management hub, wherein the bot is hosted on a bot computing system and is configured to interact with a target application through a graphical interface layer of the target application;

receiving, from the bot, a bot log, wherein the bot log comprises the real-time status of the bot and a status of steps taken by the bot;

detecting that the bot is in a failed state by determining, based on the bot log, that a user interface element within the target application has become unresponsive;

transmitting a notification to a user computing system operated by a user, wherein the notification comprises information associated with the failed state of the bot; and based on the information associated with the failed state of the bot, remediating the failed state of the bot, wherein remediating the failed state of the bot comprises applying a software update to the target application.

10. The computer program product of claim 9, wherein the notification is a role-based notification based on an identity of the user.

11. The computer program product of claim 10, wherein the user is a systems administrator, wherein the notification comprises technical data regarding the failed state of the bot.

12. A computer-implemented method for management and monitoring of robotic process automation bots, the method comprising:

continuously monitoring a real-time status of a bot via a centralized bot management hub, wherein the bot is hosted on a bot computing system and is configured to interact with a target application through a graphical interface layer of the target application;

receiving, from the bot, a bot log, wherein the bot log comprises the real-time status of the bot and a status of steps taken by the bot;

detecting that the bot is in a failed state by determining, based on the bot log, that a user interface element within a target application has become unresponsive;

transmitting a notification to a user computing system operated by a user, wherein the notification comprises information associated with the failed state of the bot; and based on the information associated with the failed state of the bot, remediating the failed state of the bot, wherein remediating the failed state of the bot comprises applying a software update to the target application.

13. The computer-implemented method of claim 12, wherein the notification is a role-based notification based on an identity of the user.

14. The computer-implemented method of claim 13, wherein the user is a systems administrator, wherein the notification comprises technical data regarding the failed state of the bot.

* * * * *